United States Patent
Takahashi et al.

(10) Patent No.: US 12,080,914 B2
(45) Date of Patent: Sep. 3, 2024

(54) CONNECTION MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hideo Takahashi, Mie (JP); Shinichi Takase, Mie (JP); Hiroki Shimoda, Mie (JP); Hideaki Nakajima, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 611 days.

(21) Appl. No.: 17/290,890

(22) PCT Filed: Nov. 1, 2019

(86) PCT No.: PCT/JP2019/043016
§ 371 (c)(1),
(2) Date: May 3, 2021

(87) PCT Pub. No.: WO2020/105399
PCT Pub. Date: May 28, 2020

(65) Prior Publication Data
US 2022/0006159 A1    Jan. 6, 2022

(30) Foreign Application Priority Data
Nov. 22, 2018   (JP) .................. 2018-219301

(51) Int. Cl.
*H01M 50/507*   (2021.01)
*H01M 50/50*   (2021.01)
(Continued)

(52) U.S. Cl.
CPC ......... *H01M 50/507* (2021.01); *H01M 50/50* (2021.01); *H01M 50/502* (2021.01); *H01M 50/519* (2021.01)

(58) Field of Classification Search
CPC .................................. H01M 50/507
See application file for complete search history.

(56) References Cited

U.S. PATENT DOCUMENTS

| 6,410,983 | B1 | 6/2002 | Moriizumi et al. | |
| 9,024,572 | B2 | 5/2015 | Nishihara et al. | |
| 2013/0302651 | A1* | 11/2013 | Kim | H01M 10/425 |
| | | | | 429/7 |

FOREIGN PATENT DOCUMENTS

| JP | 04-042763 | 4/1992 |
| JP | 2000-340917 | 12/2000 |

(Continued)

OTHER PUBLICATIONS

Official Communication issued in International Bureau of WIPO Patent Application No. PCT/JP2019/043016, dated Feb. 4, 2020, along with an English translation thereof.

*Primary Examiner* — Karie O'Neill Apicella
(74) *Attorney, Agent, or Firm* — Greenblum & Bernstein, P.L.C.

(57) ABSTRACT

A connection module includes an FPC and a plurality of bus bars. The plurality of bus bars constitute a first bus bar row disposed along one long side of the FPC, and a second bus bar row disposed along the other long side of the FPC. The FPC includes tolerance absorbing portions each including a slit and a pair of deflection portions disposed with the slit interposed therebetween, and is divided into a plurality of (Continued)

wiring portion by the tolerance absorbing portions. The pair of deflection portions constituting the first tolerance absorbing portion can be deflected in a direction in which the two wiring portions that are adjacent to each other with the first tolerance absorbing portion interposed therebetween move toward and away from each other. The same description also applies to the second tolerance absorbing portion.

9 Claims, 9 Drawing Sheets

(51) Int. Cl.
  *H01M 50/502* (2021.01)
  *H01M 50/519* (2021.01)

(56) References Cited

FOREIGN PATENT DOCUMENTS

| JP | 2009-036859 | 2/2009 |
| JP | 2013-105571 | 5/2013 |
| JP | 2013-143281 | 7/2013 |
| JP | 5621765 | 11/2014 |
| JP | 2016-207427 | 12/2016 |

* cited by examiner

CONNECTION MODULE

TECHNICAL FIELD

A technique disclosed in the present specification relates to a connection module.

BACKGROUND ART

Electricity storage modules for electric automobiles and hybrid vehicles each include a battery block composed of a plurality of battery cells, and a connection module that is attached to the battery block and connects the plurality of battery cells. As the connection module, a bus bar-equipped flexible printed circuit board is known that includes a flexible printed circuit board (FPC), and a plurality of bus bars that are connected to the flexible printed circuit board and connect the electrode terminals of the adjacent battery cells to each other.

One of a pair of electrode terminals of each of the battery cells forms a first terminal row aligned in the stacking direction of the battery cells, and the other terminal forms a second terminal row aligned in the stacking direction of the battery cells. The connection module includes two bus bar-equipped flexible printed circuit boards, one of which is connected to the first terminal row, and the other is connected to the second terminal row (see Patent Document 1).

CITATION LIST

Patent Document

Patent Document 1: Japanese Patent No. 5621765

SUMMARY OF INVENTION

Technical Problem

In a battery block formed by a plurality of battery cells, a dimensional tolerance is created owing to, for example, manufacturing dimensional errors of the battery cells and mounting errors of the plurality of battery cells. The dimensional tolerance may cause positional shift between the bus bars and the electrode terminals, thus making it difficult to mount the connection module to the battery block. In particular, when the number of battery cells is large, there is concern that the dimensional errors of the battery cells and the mounting errors may be accumulated, resulting in a large overall dimensional tolerance.

Solution to Problem

A connection module disclosed in the present specification is a connection module that can be attached to an electricity storage element group composed of a plurality of electricity storage elements each including electrode terminals, and that connects the plurality of electricity storage elements, including: a flexible printed circuit board; and a plurality of connecting members that are connected to the flexible printed circuit board, and that connect the electrode terminals of the adjacent electricity storage elements to each other, wherein the flexible printed circuit board includes a pair of first side edges, the plurality of connecting members constitute a first connecting member row disposed so as to be arranged along one of the pair of first side edges, and a second connecting member row disposed so as to be arranged along the other of the pair of first side edges, the flexible printed circuit board includes a tolerance absorbing portion including a slit extending in the same direction as the pair of first side edges, and a pair of deflection portions disposed with the slit interposed therebetween, and is divided into a plurality of connecting member placement portions by the tolerance absorbing portion, and the pair of deflection portions can be deflected in a direction in which the two connecting member placement portions that are adjacent to each other with the tolerance absorbing portion interposed therebetween move toward and away from each other.

With the above-described configuration, each of the plurality of connecting member placement portions is connected to part of the electricity storage elements of the electricity storage element group, and it is thus possible to reduce the accumulation of manufacturing dimensional errors of the electricity storage elements and mounting errors of the plurality of electricity storage elements to which the connecting member placement portions are to conform. By changing the amounts of deflection of the deflection portions, the distance between the connecting member placement portions that are adjacent to each other with the tolerance absorbing portion interposed therebetween can be varied so as to conform to the positional shift between the electrode terminals. Accordingly, it is possible to prevent difficulties in the mounting of the connection module to the electricity storage element group, thus improving the mounting workability. By providing the two connecting member rows so as to correspond to the respective ones of the two terminal rows of the electricity storage element group, the number of flexible printed circuit boards can be reduced as compared with when the connection module includes two bus bar-equipped flexible printed circuit boards respectively corresponding to two terminal rows, and it is thus possible to simplify the configuration of the connection module.

In the above-described configuration, each of the deflection portions may include, at each of opposite end portions thereof, a bent portion that is bent along a fold line extending in a direction perpendicular to the pair of first side edges and the slit.

With this configuration, it is possible to prevent the flexible printed circuit board from being bent at an unintended location.

In the above-described configuration, each of the deflection portions may include a pair of second side edges, and cut-out portions that are disposed at opposite ends of the fold line and that are recessed from the respective ones of the pair of second side edges.

With this configuration, parts of the deflection portions at which the cut-out portions are disposed are narrower than the other parts thereof, and thus are easier to bend. By setting the fold line at this position, it is possible to reliably prevent the flexible printed circuit board from being bent at an unintended location.

In the above-described configuration, the connection module may include a holding member that holds the plurality of connecting members and the flexible printed circuit board, wherein the holding member includes a plurality of holding units that hold the plurality of connecting member placement portions, and a coupling portion that couples the adjacent holding units such that the aforementioned holding units can be displaced in a direction toward and away from each other.

With this configuration, the shape of the flexible printed circuit board having flexibility can be kept constant, and the flexible printed circuit board can be set at a predetermined position on the electricity storage element group, collectively with the plurality of connecting members. In addition, the distance between the holding units that are adjacent to each other can be varied by the coupling portion so as to follow the variation in the distance between the connecting member placement portions that are adjacent to each other. Accordingly, the flexible printed circuit board can be held by the holding member, without impeding the displacement between the connecting member placement portions that are adjacent to each other.

In the above-described configuration, the flexible printed circuit board may include accommodating recesses that are respectively adjacent to the deflection portions, and that are respectively recessed from the first side edges, and the coupling portion is disposed inside the accommodating recesses in a plan view.

With this configuration, the coupling portion can be disposed within the range of the width of the flexible printed circuit board, and it is therefore possible to avoid an increase in size of the connection module.

Advantageous Effects of Invention

With the connection module disclosed in the present specification, it is possible to improve the mounting workability.

DESCRIPTION OF EMBODIMENTS

Embodiment

Figure 1:
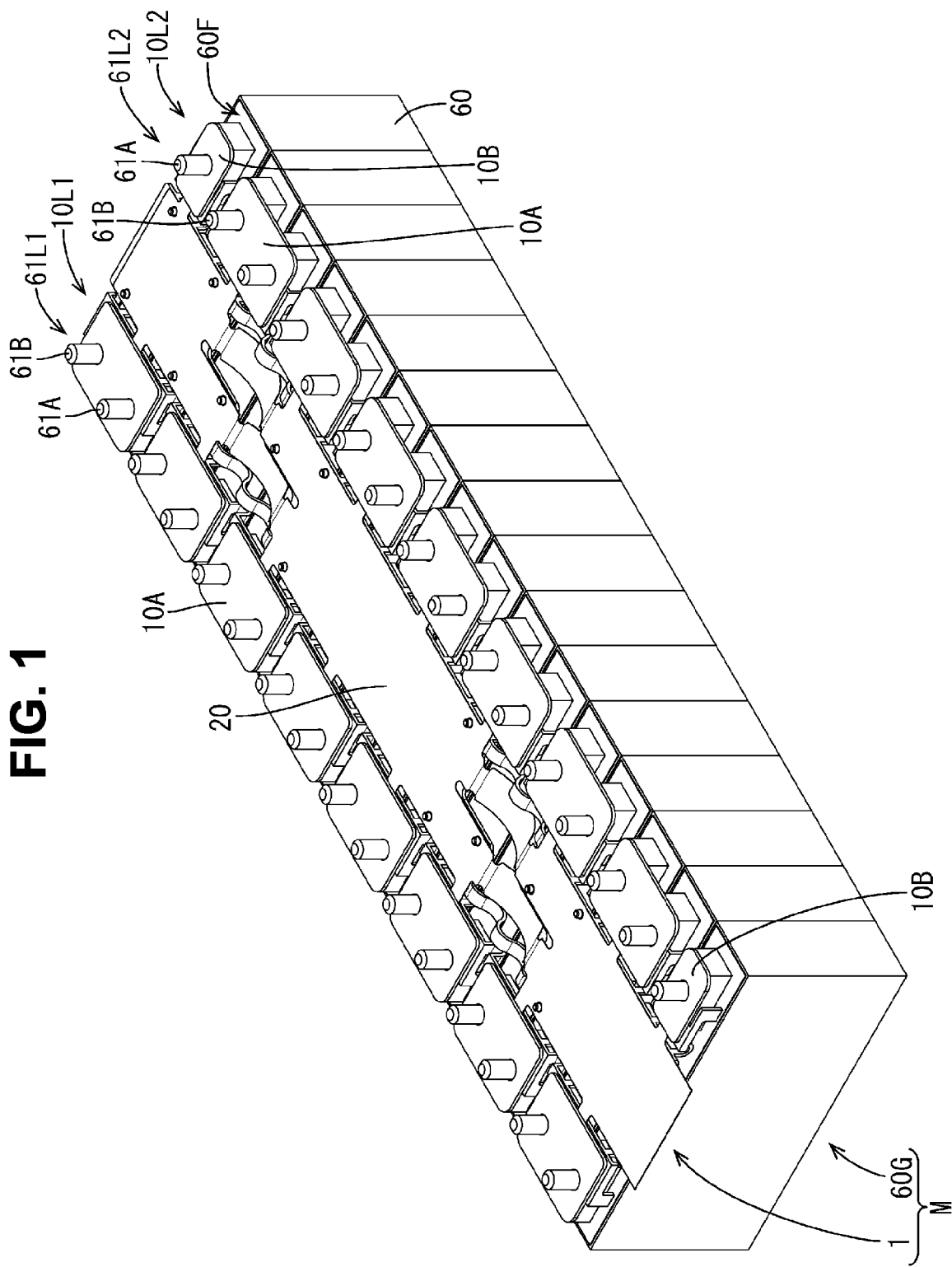
FIG. 1 is a perspective view of an electricity storage module according to an embodiment.
Figure 2:
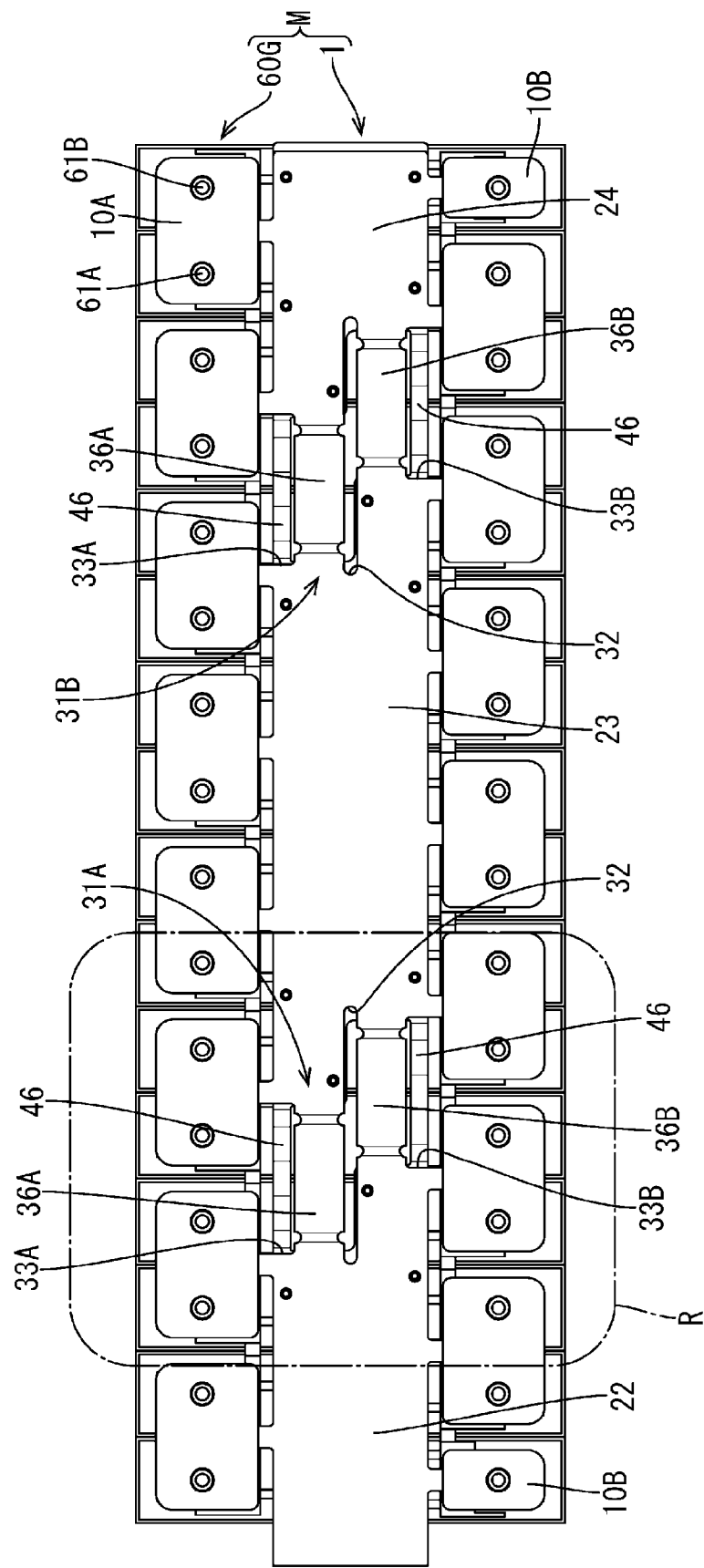
FIG. 2 is a plan view of the electricity storage module according to the embodiment.

An embodiment will be described with reference to FIGS. 1 to 7. A connection module 1 according to the present embodiment constitutes an electricity storage module M that can be used as a driving source of vehicles such as an electric automobile and a hybrid automobile. As shown in FIG. 1, the connection module 1 is attached to an electricity storage element group 60G formed by a plurality of electricity storage elements 60 arranged in a row, and connects the plurality of electricity storage elements 60 in series.

Electricity Storage Element 60 and Electricity Storage Element Group 60G

The electricity storage elements 60 are secondary batteries, for example. As shown in FIG. 1, each of the electricity storage elements 60 has a rectangular parallelepiped shape with a flat profile, and has an electrode placement surface 60F (an upper surface in FIG. 1) perpendicular to a surface opposing the adjacent electricity storage element 60. Electrode terminals 61A and 61B are disposed on the electrode placement surface 60F. One of the electrode terminals 61A and 61B is a positive electrode terminal 61A, and the other is a negative electrode terminal 61B. Each of the electrode terminals 61A and 61B has a columnar shape, and, although not shown in detail, has a thread formed on the outer circumferential surface thereof.

As shown in FIG. 1, the plurality of electricity storage elements 60 are arranged in a row to form an electricity storage element group 60G. One of the two electrode terminals 61A and 61B of each of the electricity storage elements 60 is arranged in a row to form a first terminal row 61L1, and the other is arranged in a row to form a second terminal row 61L2. The plurality of electricity storage elements 60 are arranged such that the electrode terminals 61A and 61B of different polarities are adjacent to each other (i.e., the positive electrode terminal 61A of one electricity storage element 60 and the negative electrode terminal 61B of another electricity storage element 60 adjacent thereto are adjacent to each other) in two adjacent electricity storage elements 60.

Connection Module 1

The connection module 1 is a module that can be mounted to a surface formed by the electrode placement surfaces 60F of the electricity storage elements 60 in the electricity storage element group 60G. The connection module 1 includes a flexible printed circuit board 20 (hereinafter referred to as an "FPC 20"), a plurality of bus bars (first bus bars 10A and second bus bars 10B; corresponding to connecting members) that are connected to the FPC 20 so as to connect the positive electrode terminal 61A and the negative electrode terminal 61B of the adjacent electricity storage elements 60, and a resin protector 40 (corresponding to a holding member) that holds the bus bars 10A and 10B and the FPC 20.

Bus Bars 10A and 10B

Figure 4:
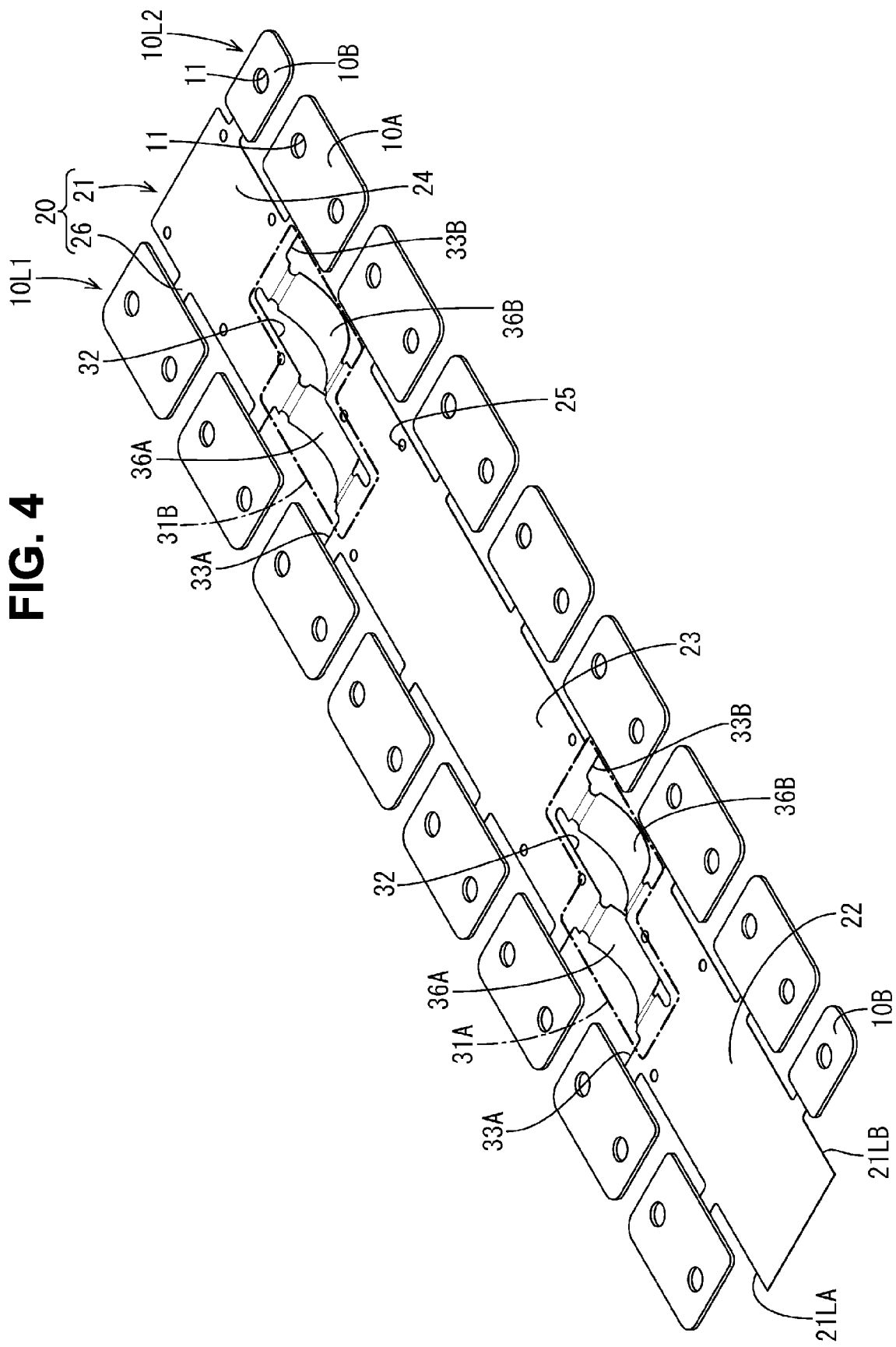
FIG. 4 is a perspective view of a flexible printed circuit board to which bus bars are connected, according to the embodiment.
Figure 5:
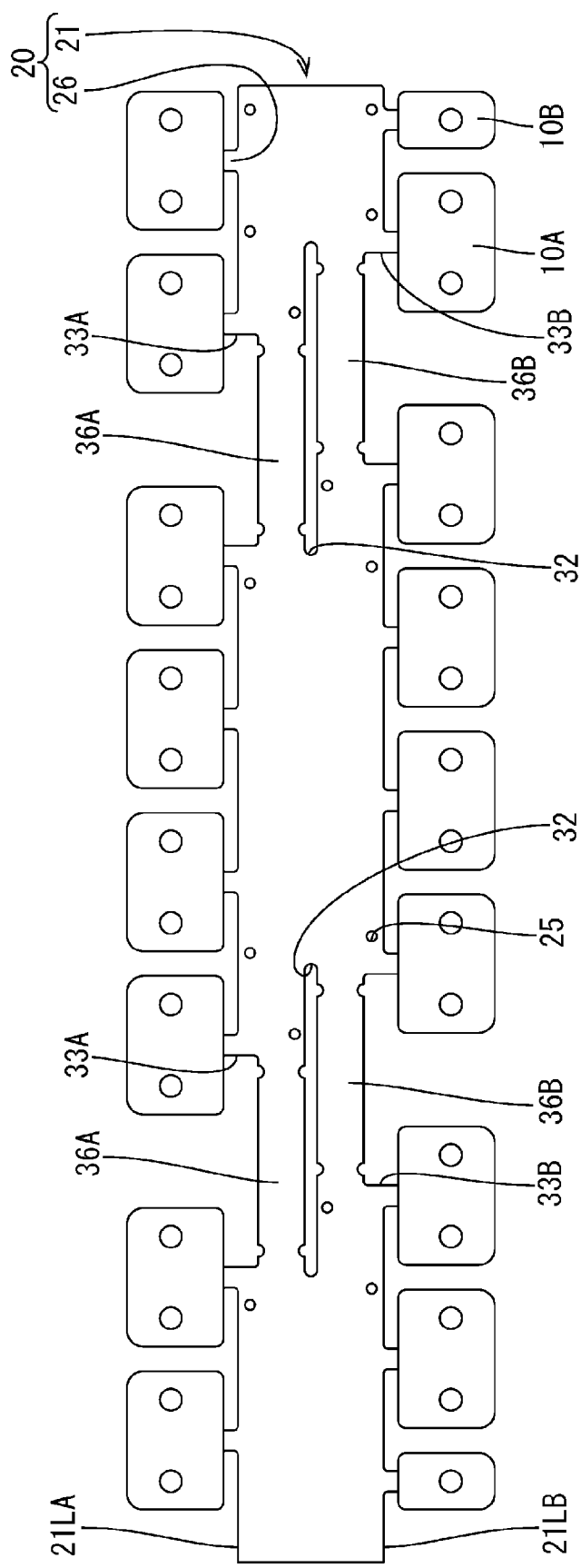
FIG. 5 is a plan view of the flexible printed circuit board to which bus bars are connected, and deflection portions are stretched, according to the embodiment.

As shown in FIG. 4, each of the plurality of bus bars 10A and 10B is a plate-shaped member made of a metal, and has an electrode insertion hole 11 or electrode insertion holes 11 through which the electrode terminals 61A and 61B can be passed. Two (one at a lower right end and one at a lower left end of opposite ends of the bus bar row on the near side in FIG. 4) of the plurality of bus bars 10A and 10B are second bus bars 10B each having one electrode insertion hole 11, and the rest are first bus bars 10A each having two electrode insertion holes 11.

FPC 20

The FPC 20 is a member for electrically connecting the plurality of bus bars 10A and 10B to an electronic control unit (ECU: not shown), and, although not shown in detail, includes a plurality of conductive paths each formed of a copper foil, and insulating resin films that cover both sides of the conductive paths. As shown in FIG. 4, the FPC 20 includes a band-shaped FPC body 21, and a plurality of connection pieces 26 that extend continuously from the FPC body 21 and are connected to the respective ones of the plurality of bus bars 10A and 10B.

The FPC body 21 has an overall elongated rectangular shape, and includes two long sides 21LA and 21LB (corresponding to first side edges) that are parallel to each other as shown in FIG. 4. As shown in FIG. 4, the FPC body 21 includes two tolerance absorbing portions (a first tolerance absorbing portion 31A and a second tolerance absorbing portion 31B), and is divided into three wiring portions (a first wiring portion 22, a second wiring portion 23, and a third wiring portion 24: corresponding to connecting member placement portions) by the two tolerance absorbing portions 31A and 31B.

The first tolerance absorbing portion 31A is disposed at a position near one end (a lower left end in FIG. 4) of the FPC body 21, and the second tolerance absorbing portion 31B is disposed at a position near the other end (an upper right end in FIG. 4) of the FPC body 21. The first tolerance absorbing portion 31A and the second tolerance absorbing portion 31B have the same configuration, and therefore the first tolerance absorbing portion 31A will be described in detail in the following. Parts of the second tolerance absorbing portion 31B that are the same as those of the first tolerance absorbing portion 31A are denoted by the same reference numerals, and the descriptions thereof have been omitted.

Figure 3:
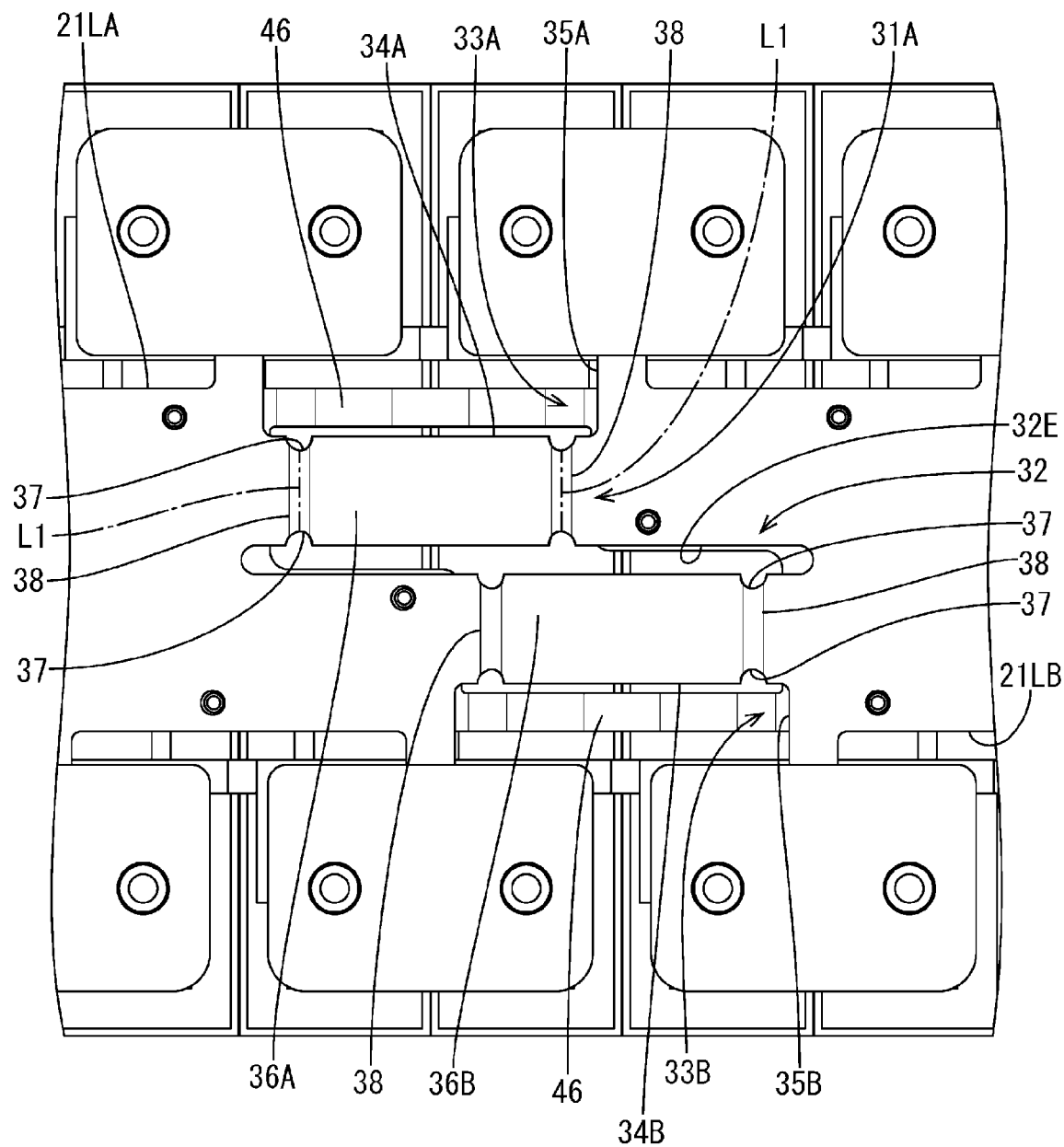
FIG. 3 is an enlarged view of the inside of a portion R in FIG. 2.

As shown in FIG. 3, the first tolerance absorbing portion 31A is composed of a slit 32 and a pair of deflection portions (a first deflection portion 36A and a second deflection portion 36B).

As shown in FIG. 3, the slit 32 is disposed at a central position between the pair of long sides 21LA and 21LB of the FPC body 21, and extends parallel to the long sides 21LA and 21LB.

As shown in FIG. 3, the FPC body 21 includes, at positions close to the slit 32, a pair of accommodating recesses (a first accommodating recess 33A and a second accommodating recess 33B). The first accommodating recess 33A is recessed from the long side 21LA toward the slit 32, and is defined by a first recessed bottom edge 34A (corresponding to a second side edge) parallel to the long side 21LA, and a pair of first recessed side edges 35A connecting the first recessed bottom edge 34A and the long side 21LA. The second accommodating recess 33B is recessed from the long side 21LB toward the slit 32, and is defined by a second recessed bottom edge 34B (corresponding to a second side edge) parallel to the long side 21LB, and a pair of second recessed side edges 35B connecting the second recessed bottom edge 34B and the long side 21LA. The first accommodating recess 33A and the second accommodating recess 33B are disposed so as to be shifted from each other in the direction in which the long sides 21LA and 21LB extend, and the first accommodating recess 33A is disposed closer to one end (the lower left end in FIG. 4) of the FPC body 21 than the second accommodating recess 33B.

As shown in FIG. 3, the first deflection portion 36A is a portion between the slit 32 and the first accommodating recess 33A, and is curved in an arch shape as shown in FIG. 4. As shown in FIG. 3, the first deflection portion 36A includes a pair of cut-out portions 37 at each of opposite end portions thereof. At one end portion of the first deflection portion 36A, one of the pair of cut-out portions 37 is a small recess that is recessed from a slit edge 32E (corresponding to a second side edge) of the slit 32 toward the first recessed bottom edge 34A, and the other is a small recess that is recessed from the first recessed bottom edge 34A toward the slit edge 32E. One end portion of the first deflection portion 36A includes a bent portion 38 that is bent at a line perpendicular to the long side 21LA as a fold line L1, and that connects cut-out edges of the two cut-out portions 37. The same description also applies to the other end portion of the first deflection portion 36A.

As shown in FIG. 3, the second deflection portion 36B is a portion interposed between the slit 32 and the second accommodating recess 33B, and is curved in an arch shape as in the case of the first deflection portion 36A. Because the second deflection portion 36B has the same configuration as that of the first deflection portion 36A, similar portions are denoted by the same reference numerals, and the descriptions thereof have been omitted.

The first deflection portion 36A and the second deflection portion 36B are disposed so as to be shifted from each other in the direction in which the long sides 21LA and 21LB extend, and the first deflection portion 36A is disposed closer to the one end (the lower left end in FIG. 4) of the FPC body 21 than the second deflection portion 36B.

As shown in FIG. 4, the first wiring portion 22 and the second wiring portion 23 are connected by the first tolerance absorbing portion 31A, and the second wiring portion 23 and the third wiring portion 24 are connected by the second tolerance absorbing portion 31B. The first tolerance absorbing portion 31A can be extended or contracted as a result of the amounts of deflection of the two deflection portions 36A and 36B changing in a direction extending along the long sides 21LA and 21LB (the direction from the lower left to the upper right in FIG. 4). This allows the first wiring portion 22 and the second wiring portion 23 to be displaced in the direction toward and away from each other. Similarly, the second tolerance absorbing portion 31B allows the second wiring portion 23 and the third wiring portion 24 to be displaced in the direction toward and away from each other.

As shown in FIG. 4, the first wiring portion 22, the second wiring portion 23, and the third wiring portion 24 each have a plurality of positioning holes 25. Part of the plurality of positioning holes 25 are disposed at positions near the other end of the FPC body 21, and the rest are disposed around the two tolerance absorbing portions 31A and 31B.

As shown in FIG. 4, each of the plurality of connection pieces 26 is a plate piece-shaped portion extending continuously from the FPC body 21. As shown in FIG. 4, half of the plurality of connection pieces 26 are disposed so as to be arranged in a row along the long side 21LA, and the remaining half are arranged in a row along the long side 21LB. Part of the plurality of connection pieces 26 extend continuously from the first wiring portion 22, other part thereof extend continuously from the second wiring portion 23, and the rest extend continuously from the third wiring portion 24.

At a distal end portion of each connection piece 26, a portion of the conductive path is exposed as a joining land (not shown), to which the bus bars 10A and 10B are connected by soldering. As shown in FIG. 4, about half of the plurality of first bus bars 10A are disposed so as to be arranged in a row along the long side 21LA, and constitute a first bus bar row 10L1 (corresponding to a connecting member row). The rest of the first bus bars 10A and the second bus bars 10B are arranged in a row along the long side 21LB, and constitute a second bus bar row 10L2 (corresponding to a connecting member row). In the second bus bar row 10L2, the second bus bars 10B are disposed at opposite ends, between which the plurality of first bus bars 10A are disposed.

Resin Protector 40

The resin protector 40 is made of a synthetic resin, and includes an FPC holding portion 41 that holds the FPC body 21, and a plurality of bus bar holding portions (a first bus bar holding portion 51A and a second bus bar holding portion 51B) that each hold the bus bars 10A and 10B.

Figure 6:
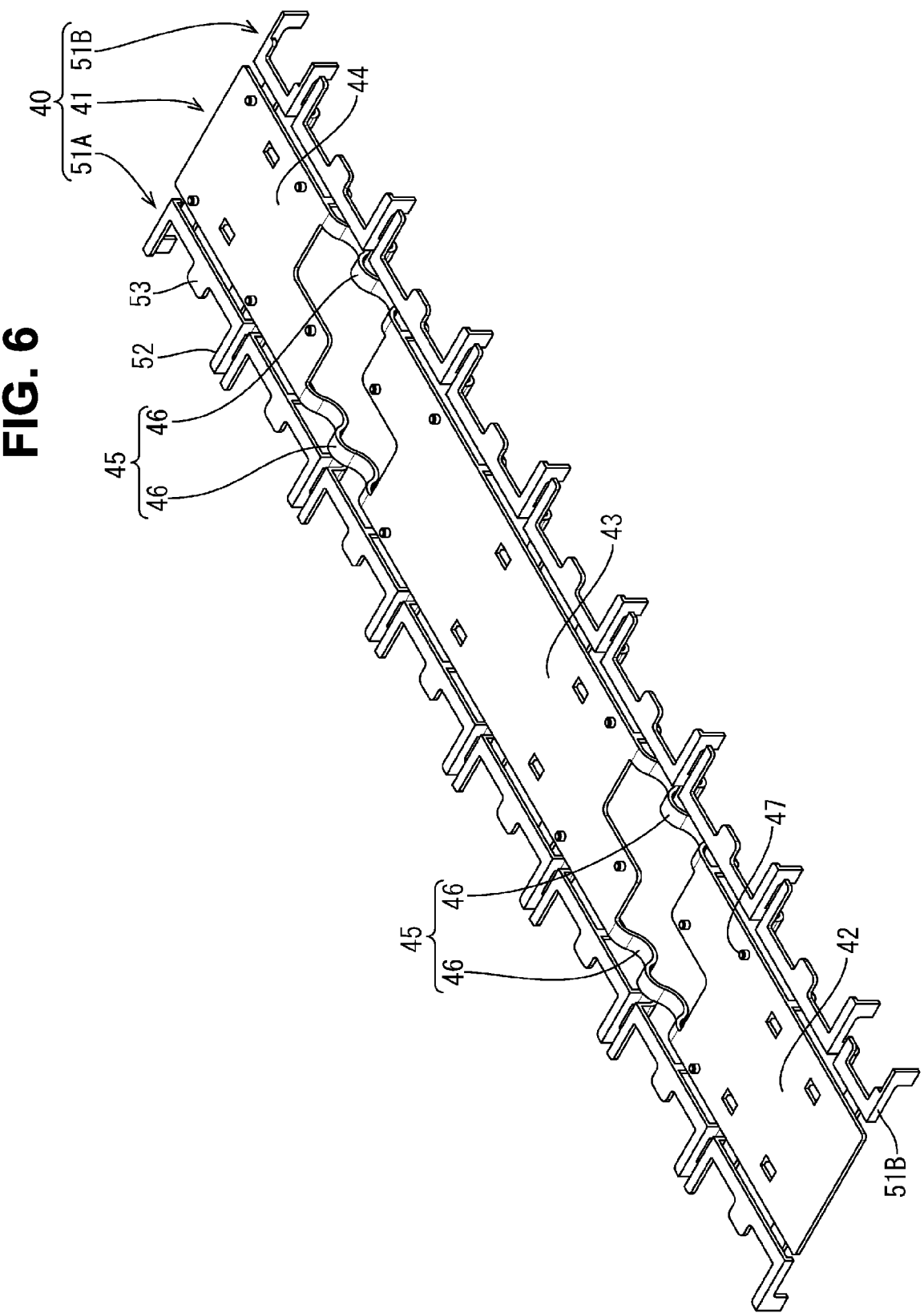
FIG. 6 is a perspective view of a resin protector according to the embodiment.
Figure 7:
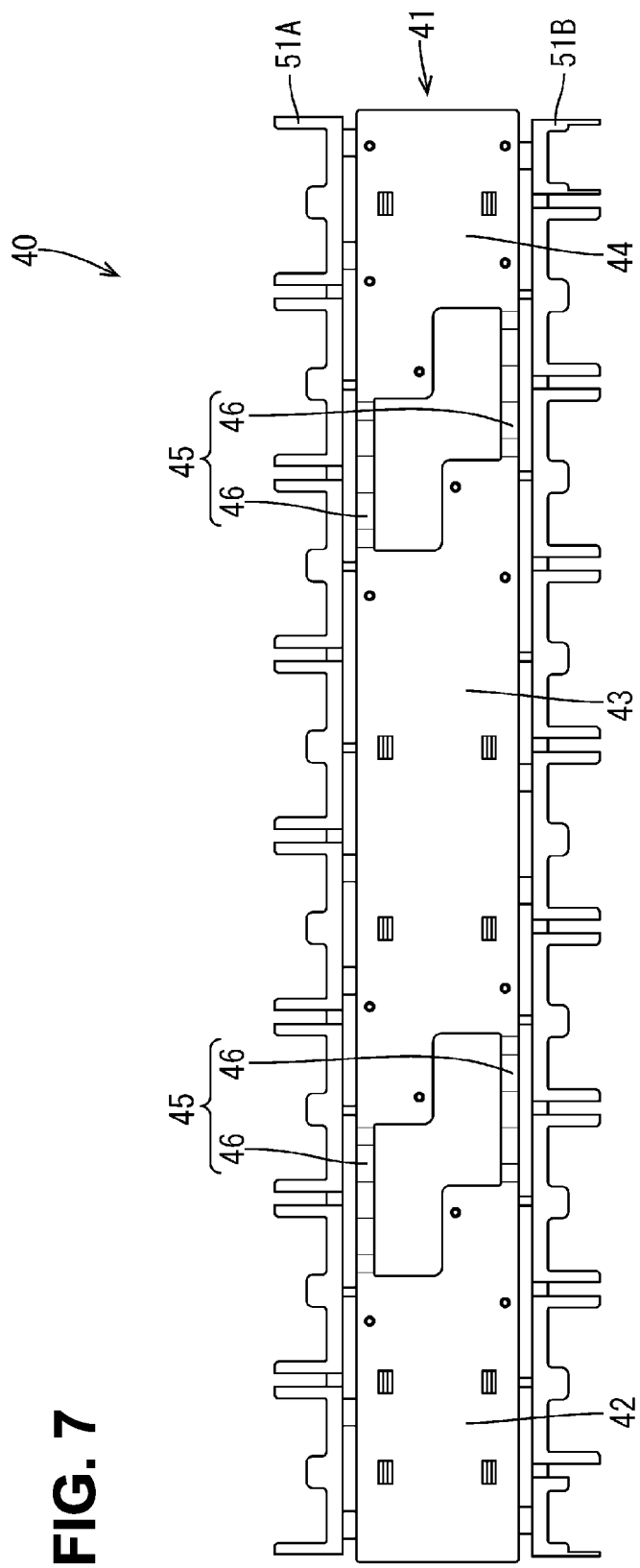
FIG. 7 is a plan view of the resin protector according to the embodiment.

As shown in FIG. 6, the FPC holding portion 41 includes three holding units (a first holding unit 42, a second holding unit 43, and a third holding unit 44), and two sets of coupling portions 45 that the holding units 42, 43, and 44 that are adjacent to each other, and has an overall elongated rectangular plate shape having substantially the same size as that of the FPC body 21. The first holding unit 42 is a portion that holds the first wiring portion 22, and has a plate shape having an outer shape substantially identical to that of the first wiring portion 22. The second holding unit 43 is a portion that holds the second wiring portion 23, and has a plate shape having an outer shape substantially identical to that of the second wiring portion 23. The third holding unit 44 is a portion that holds the third wiring portion 24, and has a plate shape having an outer shape substantially identical to that of the third wiring portion 24. Positioning projections 47 that are inserted into the positioning holes 25 of the FPC body 21 protrude from the three holding units 42, 43, and 44.

As shown in FIG. 6, one of the two sets of the coupling portions 45 is a portion that couples the first holding unit 42 and the second holding unit 43, and the other is a portion that couples the second holding unit 43 and the third holding unit 44. Each of the coupling portions 45 is composed of two coupling spring portions 46. Each of the coupling spring portions 46 is a portion in the form of a plate spring with a W-shape. The bending deformation of the coupling spring portions 46 enables the three holding units 42, 43, and 44 to be displaced in the direction toward and away from each other.

Two (one at a lower right end and one at a lower left end of opposite ends of the bus bar row on the near side in FIG. 6) of the plurality of bus bar holding portions 51A and 51B are second bus bar holding portions 51B that hold the second bus bars 10B, and the rest are first bus bar holding portions 51A that hold the first bus bars 10A.

Each first bus bar holding portion 51A includes a U-shaped bus bar mount frame 52 that supports three sides of a first bus bar 10A, and a plate piece-shaped extension piece 53 that extends from the bus bar mount frame 52 and covers a distal end portion of the connection piece 26 connected to the first bus bar 10A. Each second bus bar holding portion 51B has a U-shaped frame shape that supports three sides of a second bus bar 10B. Although not shown in detail, each of the bus bar holding portions 51A and 51B is connected to the FPC holding portion 41 by a U-shaped plate spring portion.

Assembly of Connection Module 1

An example of the procedure for assembling the connection module 1 having the above-described configuration will be described below.

First, the plurality of bus bars 10A and 10B are connected to the FPC 20. The bus bars 10A and 10B are laid on the connection pieces 26 of the FPC 20, and are joined thereto by reflow soldering.

Next, a joined body of the FPC 20 and the plurality of bus bars 10A and 10B is mounted to the resin protector 40. The FPC body 21 is laid on top of the FPC holding portion 41, and the bus bars 10A and 10B are laid on top of the respective corresponding bus bar holding portions 51A and 51B. By each of the plurality of positioning projections 47 being passed through the corresponding one of the plurality of positioning holes 25, the first wiring portion 22 is positioned at the first holding unit 42, the second wiring portion 23 at the second holding unit 43, and the third wiring portion 24 at the third holding unit 44. Each of the plurality of coupling spring portions 46 is disposed inside the corresponding one of the first accommodating recesses 33A and the second accommodating recesses 33B.

Mounting of Connection Module 1 to Electricity Storage Element Group 60G

An example of the procedure for mounting the connection module 1 having the above-described configuration to the electricity storage element group 60G will be described below.

As shown in FIG. 1, the connection module 1 is disposed at a predetermined position on the electricity storage element group 60G, and the electrode terminals 61A and 61B are passed through the electrode insertion holes 11 of the bus bars 10A and 10B. Then, a nut, which is not shown, is screwed to each of the electrode terminals 61A and 61B, thereby connecting the electrode terminals 61A and 61B to the bus bars 10A and 10B. The first bus bars 10A constituting the first bus bar row 10L1 are connected to the electrode terminals 61A and 61B constituting the first terminal row 61L1, and the bus bars 10A and 10B constituting the second bus bar row 10L2 are connected to the electrode terminals 61A and 61B constituting the second terminal row 61L2.

Here, in the electricity storage element group 60G formed by arranging a large number of electricity storage elements 60, a large dimensional tolerance may be created by the accumulation of manufacturing dimensional errors of the electricity storage elements 60 and mounting errors of the plurality of electricity storage elements 60. In such a case, the positional shift between the electrode terminals 61A and 61B in a direction extending along the arrangement direction of the electricity storage elements 60 (the direction from the lower left to the upper right in FIG. 1) may increase.

As described above, the extension and contraction of the first tolerance absorbing portion 31A and the second tolerance absorbing portion 31B allows the first wiring portion 22 and the second wiring portion 23, as well as the second wiring portion 23 and the third wiring portion 24, to be displaced in the direction toward and away from each other. This makes it possible to relatively displace the three wiring portions 22, 23, and 24 so as to conform to the positional shift between the electrode terminals 61A and 61B due to the dimensional tolerance of the electricity storage element group 60G, thus mounting the bus bars 10A and 10B to the electrode terminals 61A and 61B.

In this manner, it is possible to prevent difficulties in the mounting of the connection module 1 to the electricity storage element group 60G due to the dimensional tolerance of the electricity storage element group 60G, thus improving the mounting workability.

The resin protector 40 includes the three holding units 42, 43, and 44, and the first wiring portion 22, the second wiring portion 23, and the third wiring portion 24 are held in a positioned state by the first holding unit 42, the second holding unit 43, and the third holding unit 44, respectively. Because the coupling portions 45 enable the three holding units 42, 43, and 44 to be displaced in the direction toward and away from each other, the three holding units 42, 43, and 44 can be displaced so as to conform to the relative displacement of the first wiring portion 22, the second wiring portion 23, and the third wiring portion 24. Accordingly, the FPC 20 can be held by the resin protector 40, without impeding the absorption of the dimensional tolerance due to displacement of the first wiring portion 22, the second wiring portion 23, and the third wiring portion 24.

SUMMARY

As described thus far, according to the present embodiment, the connection module 1 is a module that can be attached to an electricity storage element group 60G composed of a plurality of electricity storage elements 60 each including electrode terminals 61A and 61B, and that connects the plurality of electricity storage elements 60, and the module includes an FPC 20, and a plurality of bus bars 10A and 10B that are connected to the FPC 20, and that connect the electrode terminals 61A and 61B of the adjacent electricity storage elements 60 to each other. The FPC 20 includes a pair of long sides 21LA and 21LB, and the plurality of bus bars 10A and 10B constitute a first bus bar row 10L1 disposed along one long side 21LA of the pair of long sides 21LA and 21LB, and a second bus bar row 10L2 disposed along the other long side 21LB. The FPC 20 includes a first tolerance absorbing portion 31A and a second tolerance absorbing portion 31B each including a slit 32 extending in the same direction as the pair of long sides 21LA and 21LB, and a pair of deflection portions 36A and 36B disposed with the slit 32 interposed therebetween, and is divided into a plurality of wiring portion 22, 23, and 24 by the tolerance absorbing portions 31A and 31B. The pair of deflection portions 36A and 36B constituting the first tolerance absorbing portion 31A can be deflected in a direction in which the two wiring portions 22 and 23 that are adjacent to each other with the first tolerance absorbing portion 31A interposed therebetween move toward and away from each other. The same description also applies to the second tolerance absorbing portion 31B.

With the above-described configuration, each of the plurality of wiring portions 22, 23, and 24 is connected to part of the electricity storage elements 60 of the electricity storage element group 60G, and it is thus possible to reduce the accumulation of manufacturing dimensional errors of the electricity storage elements 60 and mounting errors of the plurality of electricity storage elements 60 to which the wiring portions 22, 23, and 24 are to conform. By changing the amounts of deflection of the deflection portions 36A and 36B, the distance between the first wiring portion 22 and the second wiring portion 23 that are adjacent to each other with the first tolerance absorbing portion 31A interposed therebetween, and the distance between the second wiring portion 23 and the third wiring portion 24 that are adjacent to each other with the second tolerance absorbing portion 31B interposed therebetween can be varied so as to conform to the positional shift between the electrode terminals 61A and 61B. By providing the two bus bar rows 10L1 and 10L2 so as to correspond to the respective ones of the two terminal rows 61L1 and 61L2 of the electricity storage element group 60G, the number of FPCs can be reduced as compared with when the connection module includes two bus bar-equipped flexible printed circuit boards respectively corresponding to two terminal rows, and it is thus possible to simplify the configuration of the connection module 1.

Each of the deflection portions 36A and 36B may include, at each of opposite end portions thereof, a bent portion 38 that is bent along a fold line L1 extending in a direction perpendicular to the pair of long sides 21LA and 21LB and the slit 32. With this configuration, it is possible to prevent the FPC 20 from being bent at an unintended location.

The first deflection portion 36A may include cut-out portions 37 that are disposed at opposite ends of the fold line L1, and that are recessed from the long side 21LA and the first recessed bottom edge 34A, and the second deflection portion 36B may include cut-out portions 37 that are disposed at opposite ends of the fold line L1, and that are recessed from the long side 21LB and the second recessed bottom edge 34B.

With this configuration, parts of the deflection portions 36A and 36B at which the cut-out portions 37 are disposed are narrower than the other parts thereof, and thus are easier to bend. By setting the fold line L1 at this position, it is possible to reliably prevent the FPC 20 from being bent at an unintended location.

The connection module 1 may include a resin protector 40 that holds the plurality of bus bars 10A and 10B and the FPC 20, and the resin protector 40 may include a plurality of holding units 42, 43, and 44 that hold the plurality of wiring portions 22, 23, and 24, and a coupling portion 45 that couples the adjacent holding units 42, 43, and 44 such that the aforementioned holding units 42, 43, and 44 can be displaced in a direction toward and away from each other.

With this configuration, the shape of the FPC 20 having flexibility can be kept constant, and the FPC 20 can be set at a predetermined position on the electricity storage element group 60G, collectively with the plurality of bus bars 10A and 10B. In addition, the distance between the holding units 42, 43, and 44 that are adjacent to each other can be varied by the coupling portion 45 so as to follow the variation in the distance between the wiring portions 22, 23, and 24 that are adjacent to each other. Accordingly, the FPC 20 can be held by the resin protector 40, without impeding the displacement between the wiring portions 22, 23, and 24 that are adjacent to each other.

In the above-described configuration, the FPC 20 may include accommodating recesses 33A and 33B that are respectively adjacent to the deflection portions 36A and 36B, and that are recessed from the respective ones of the long sides 21LA and 21LB, and the coupling portions 45 may be disposed inside the accommodating recesses 33A and 33B in a plan view.

With this configuration, the coupling portion 45 can be disposed within the range of the width of the FPC 20, and it is therefore possible to avoid an increase in size of the connection module 1.

Modification

Figure 8:
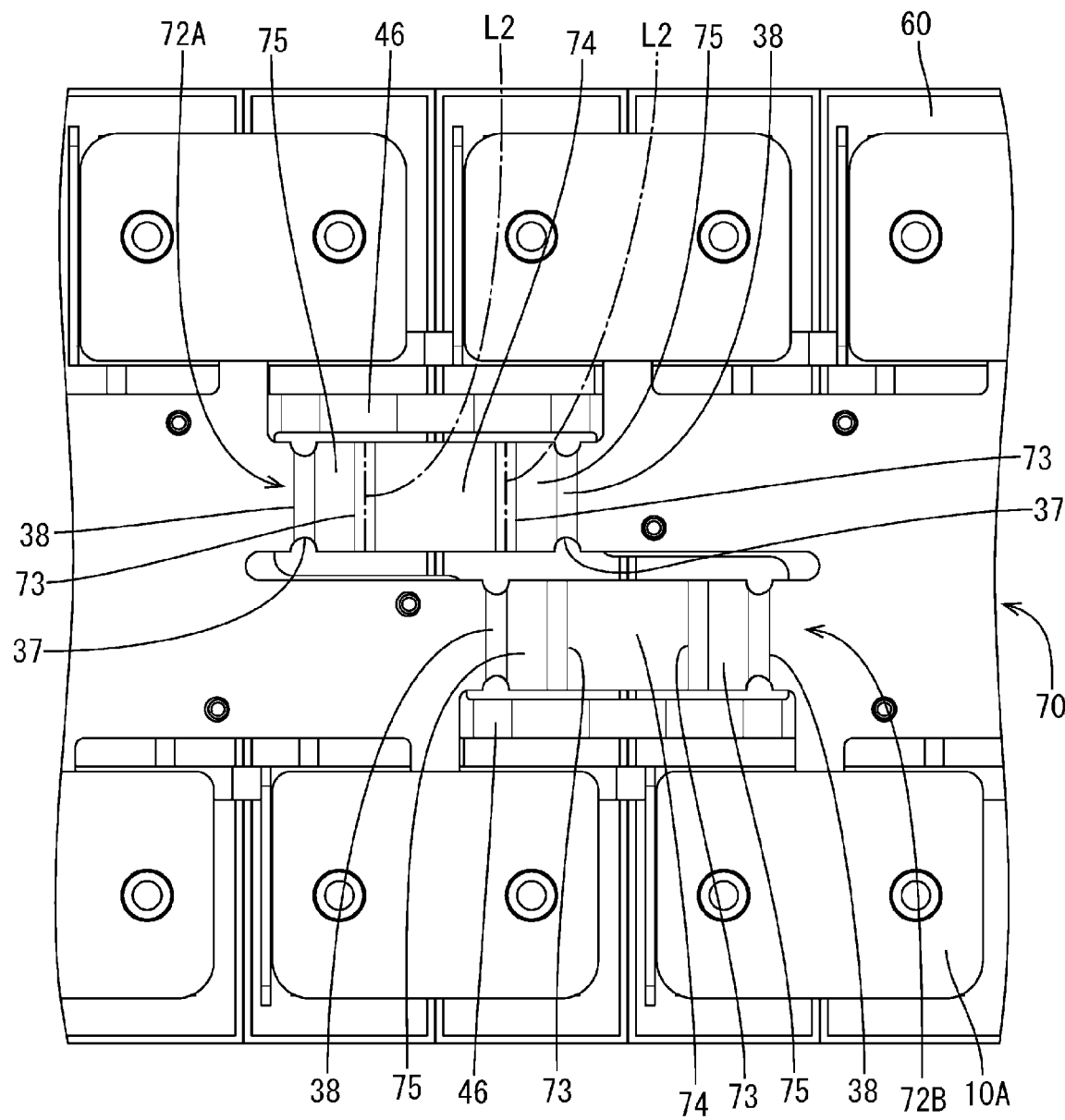
FIG. 8 is a partially enlarged plan view of an electricity storage module according to a modification.
Figure 9:
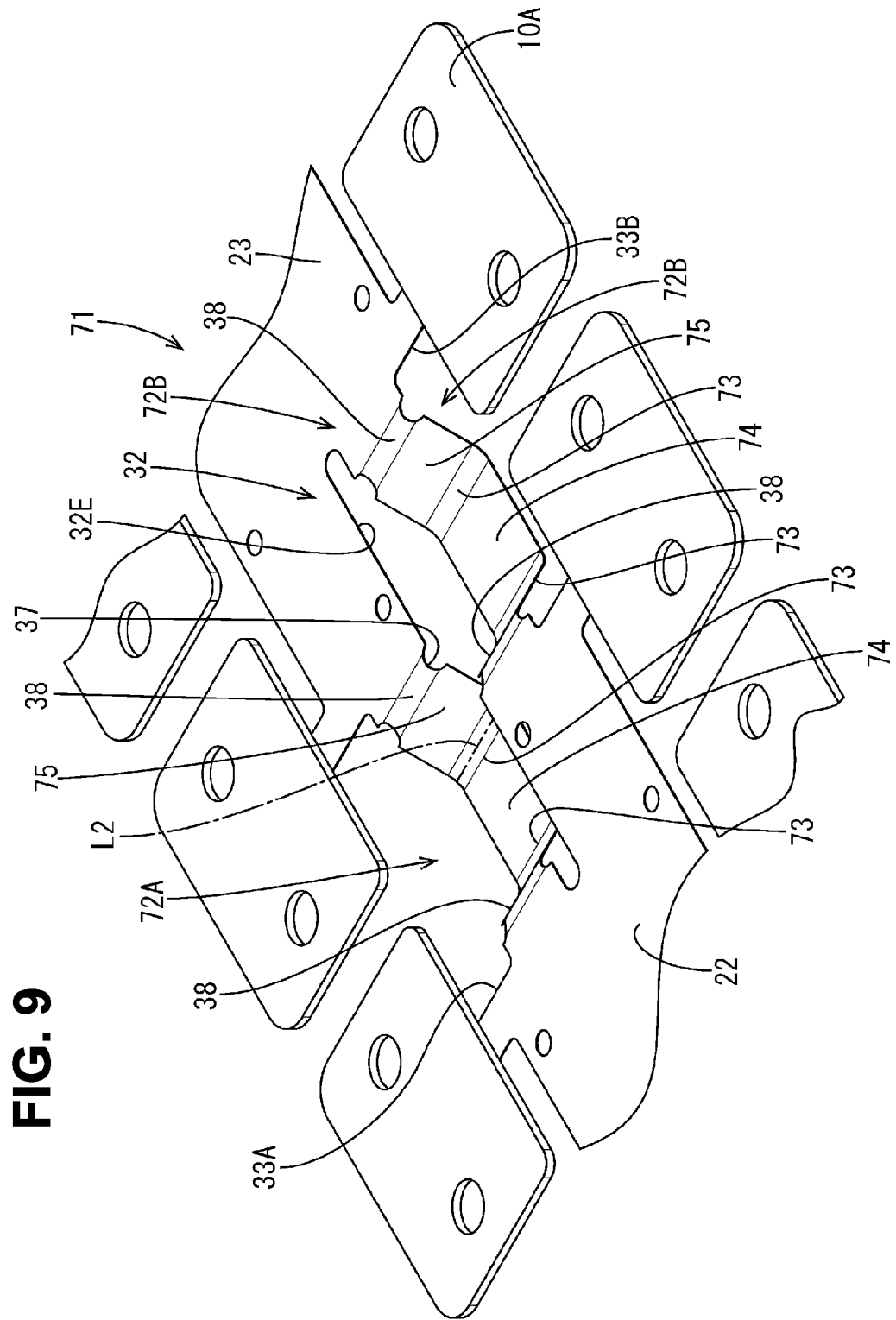
FIG. 9 is a partially enlarged perspective view of a flexible printed circuit board to which bus bars are connected, according to the modification.

A modification will be described with reference to FIGS. 8 and 9. A connection module 70 according to the modification is partly different from the above-described embodiment with regard to the shape of a first deflection portion 72A and a second deflection portion 72B included in the FPC 71. The first deflection portion 72A according to the present modification includes a pair of intermediate bent portions 73. The pair of intermediate bent portions 73 are disposed between a pair of bent portions 38 so as to be spaced apart from each other.

Each of the intermediate bent portions 73 is a portion that is bent along an intermediate fold line L2 perpendicular to the long side 21LA. A part of the first deflection portion 72A that is interposed between the two intermediate bent portions 73 constitutes a parallel portion 74 that is parallel to the wiring portions 22, 23, and 24, and a part of the first deflection portion 72A that is interposed between an intermediate bent portion 73 and a bent portion 38 that are adjacent to each other constitutes an inclined portion 75 that is inclined relative to the parallel portion 74. The same description also applies to the second deflection portion 72B.

The rest of the configuration is the same as that of the embodiment, and therefore the same components as those of the embodiment are denoted by the same reference numerals, and the descriptions thereof have been omitted.

The present modification can also achieve the same operation and effects as those of the above-described embodiment. In addition, the interval between the adjacent wiring portions 22, 23, and 24 can be readily adjusted by adjusting the bending angles of the intermediate bent portions 73.

Other Embodiments

The technique disclosed in the present specification is not limited to the embodiment described above by way of the description and the drawings, and includes, for example, various embodiments as follows.

(1) Although the FPC 20 includes the first tolerance absorbing portion 31A and the second tolerance absorbing portion 31B in the above embodiment, the number of tolerance absorbing portions may be one, or three or more.

(2) The shape of the coupling portions is not limited to that described in the above embodiment, and may be a bellows shape, for example.

LIST OF REFERENCE NUMERALS 1, 70 Connection module
10A First bus bar (connecting member)
10B Second bus bar (connecting member)
10L1 First bus bar row (first connecting member row)
10L2 Second bus bar row (second connecting member row)
20, 71 FPC (flexible printed circuit board)
21LA, 21LB Long side (first side edge)
22 First wiring portion (connecting member placement portion)
23 Second wiring portion (connecting member placement portion)
24 Third wiring portion (connecting member placement portion)
31A First tolerance absorbing portion (tolerance absorbing portion)
31B Second tolerance absorbing portion (tolerance absorbing portion)
32 Slit
32E Slit edge (second side edge)
33A First accommodating recess (accommodating recess)
33B Second accommodating recess (accommodating recess)
34A First recessed bottom edge (second side edge)
34B Second recessed bottom edge (second side edge)
36A, 72A First deflection portion (deflection portion)
36B, 72B Second deflection portion (deflection portion)
37 Cut-out portion
38 Bent portion
40 Resin protector (holding member)
42 First holding unit (holding unit)
43 Second holding unit (holding unit)
44 Third holding unit (holding unit)
45 Coupling portion
60 Electricity storage element
60G Electricity storage element group
61A Positive electrode terminal (electrode terminal)
61B Negative electrode terminal (electrode terminal)
73 Intermediate bent portion

The invention claimed is:

1. A connection module that can be attached to an electricity storage element group composed of a plurality of electricity storage elements each including electrode terminals, and that connects the plurality of electricity storage elements, comprising:
a flexible printed circuit board; and a plurality of connecting members that are connected to the flexible printed circuit board, and that connect the electrode terminals of adjacent electricity storage elements to each other,
wherein the flexible printed circuit board includes a pair of first side edges,
the plurality of connecting members constitute a first connecting member row disposed so as to be arranged along one of the pair of first side edges, and a second connecting member row disposed so as to be arranged along the other of the pair of first side edges,
the flexible printed circuit board includes a tolerance absorbing portion including a slit extending in the same direction as the pair of first side edges, and a pair of deflection portions disposed with the slit interposed therebetween, and is divided into a plurality of connecting member placement portions by the tolerance absorbing portion,
wherein the slit and the pair of deflection portions are formed in a surface of the flexible printed circuit board that is defined between the pair of first side edges, and
the pair of deflection portions can be deflected in a direction in which the two connecting member placement portions that are adjacent to each other with the tolerance absorbing portion interposed therebetween move toward and away from each other.

2. The connection module according to claim 1, wherein each of the deflection portions includes, at each of opposite end portions thereof, a bent portion that is bent along a fold line extending in a direction perpendicular to the pair of first side edges and the slit.

3. The connection module according to claim 2, wherein each of the deflection portions includes a pair of second side edges, and cut-out portions that are disposed at opposite ends of the fold line and that are recessed from the respective ones of the pair of second side edges.

4. The connection module according to claim 1, comprising
a holding member that holds the plurality of connecting members and the flexible printed circuit board,
wherein the holding member includes a plurality of holding units that hold the plurality of connecting member placement portions, and a coupling portion that couples adjacent holding units such that said holding units can be displaced in a direction toward and away from each other.

5. The connection module according to claim 4, wherein the flexible printed circuit board includes accommodating recesses that are respectively adjacent to the deflection portions, and that are respectively recessed from the first side edges, and
the coupling portion is disposed inside the accommodating recesses in a plan view.

6. A connection module that can be attached to an electricity storage element group composed of a plurality of electricity storage elements each including electrode terminals, and that connects the plurality of electricity storage elements, comprising:
a flexible printed circuit board; and a plurality of connecting members that are connected to the flexible printed circuit board, and that connect the electrode terminals of the adjacent electricity storage elements to each other,
wherein the flexible printed circuit board includes a pair of first side edges, the plurality of connecting members constitute a first connecting member row disposed so as to be arranged along one of the pair of first side edges, and a second connecting member row disposed so as to be arranged along the other of the pair of first side edges, the flexible printed circuit board includes a tolerance absorbing portion including a slit extending in the same direction as the pair of first side edges, and a pair of deflection portions disposed with the slit interposed therebetween, and is divided into a plurality of connecting member placement portions by the tolerance absorbing portion, the pair of deflection portions can be deflected in a direction in which the two connecting member placement portions that are adjacent to each other with the tolerance absorbing portion interposed therebetween move toward and away from each other, and wherein each of the deflection portions includes, at each of opposite end portions thereof, a bent portion that is bent along a fold line extending in a direction perpendicular to the pair of first side edges and the slit.

7. The connection module according to claim 6, wherein each of the deflection portions includes a pair of second side edges, and cut-out portions that are disposed at opposite ends of the fold line and that are recessed from the respective ones of the pair of second side edges.

8. The connection module according to claim 6, comprising
a holding member that holds the plurality of connecting members and the flexible printed circuit board,
wherein the holding member includes a plurality of holding units that hold the plurality of connecting member placement portions, and a coupling portion that couples adjacent holding units such that said holding units can be displaced in a direction toward and away from each other.

9. The connection module according to claim 8,
wherein the flexible printed circuit board includes accommodating recesses that are respectively adjacent to the deflection portions, and that are respectively recessed from the first side edges, and
the coupling portion is disposed inside the accommodating recesses in a plan view.

* * * * *